(12) United States Patent
Harris

(10) Patent No.: US 7,027,216 B1
(45) Date of Patent: Apr. 11, 2006

(54) TEMPERATURE CONTROL IN OPTICAL AMPLIFIER SYSTEMS TO REDUCE PMD FLUCTUATION

(75) Inventor: David Harris, Pleasanton, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 166 days.

(21) Appl. No.: 10/664,285

(22) Filed: Sep. 17, 2003

(51) Int. Cl.
*H01S 3/00* (2006.01)

(52) U.S. Cl. .................................. 359/337.5; 359/337

(58) Field of Classification Search ................ None
See application file for complete search history.

(56) References Cited

U.S. PATENT DOCUMENTS 5,793,917 A * 8/1998 Yoshimura .................. 385/100
6,810,179 B1 * 10/2004 Ohira et al. .................. 385/37

* cited by examiner

*Primary Examiner*—Mark Hellner

(57) ABSTRACT

An optical amplifier system is disclosed comprising a span of dispersion compensating fiber (DCF) and a temperature control system. The temperature control system is positioned proximate to the DCF span. The DCF span is configured to carry optical signals. The temperature control system is configured to control the temperature of the environment directly surrounding the DCF span to reduce polarization mode dispersion (PMD) fluctuation in the DCF span.

6 Claims, 3 Drawing Sheets

TEMPERATURE CONTROL IN OPTICAL AMPLIFIER SYSTEMS TO REDUCE PMD FLUCTUATION

BACKGROUND OF THE INVENTION

1. Field of the Invention

The invention is related to the field of optical communication networks, and in particular, to controlling the temperature of a dispersion compensating fiber in an optical amplifier system to reduce polarization mode dispersion (PMD) fluctuation.

2. Statement of the Problem

Many communication companies use an optical network for transmitting data because of its high-bandwidth capacity. Fiber optic cables in the optical network reliably transport optical signals over long distances between a transmitter and a receiver. The fiber optic cables are comprised of transmission fiber, such as a single mode fiber (SMF). Over the length of SMF, the optical signals experience some degradation due to attenuation along the fiber. Fiber background loss in the fiber causes the attenuation, typically about 0.2 dB/km. The optical signals also degrade due to other limitations, such as chromatic dispersion, Polarization Mode Dispersion (PMD), and nonlinear effects.

Optical amplifiers may recover the signal strength of the optical signals. However, optical amplifiers can only recover the power of the optical signals. Distortions caused by chromatic dispersion (CD) and PMD can be recovered by using some form of CD compensation technique and PMD compensation technique, respectively.

In optical networks having bit rates 10 Gb/s and higher, PMD and chromatic dispersion are two major sources of distortion for optical signals. Typically, optical amplifiers use dispersion compensation fiber (DCF) or a dispersion compensation module (DCM) to compensate for chromatic dispersion. DCF has a negative dispersion characteristic that can be used to compensate the positive dispersion from SMF. Some DCMs include a span of dispersion compensating fiber wound around a spool and set in an adhesive for support. The length of the dispersion compensating fiber in the DCM depends on the length of transmission fiber preceding the DCM in the optical network, and the amount of compensation needed. For instance, assume that chromatic dispersion on a SMF is 17 ps/nm per kilometer. For a 100 km span of SMF, the chromatic dispersion is about 1700 ps/nm. A DCF with about −1700 ps/nm at 1550 nm wavelength would be required. The length of DCF for −1700 ps/nm is typically about 10 km long.

When compensating for chromatic dispersion, the bit rate of the optical network is also a concern. As the bit rates increase for an optical network, the tolerance for chromatic dispersion compensation decreases. For instance, for a 10 Gb/s bit rate, the tolerance for chromatic dispersion compensation may be +/−800 ps/nm. For a 40 Gb/s bit rate, the tolerance for chromatic dispersion compensation may be +/−25 ps/nm. Thus, as the bit rates increase in optical networks, chromatic dispersion compensation needs to be more precise.

The following examples illustrate optical amplifiers that include DCF to compensate for chromatic dispersion. One example is an Erbium-doped Fiber Amplifier (EDFA). EDFAs may be single stage, 2-stage, 3-stage, etc. A 2-stage EDFA includes a first stage comprising a span of Erbium-doped fiber and one or more pumps, and a second stage comprising a span of Erbium-doped fiber and one or more pumps. DCF connects between the first and second stage. The DCF connects to the output of the first stage and the input of the second stage of the amplifier. In operation, the span of Erbium-doped fiber in the first stage receives optical signals to be amplified. The pumps in the first stage pump the Erbium-doped fiber as the optical signals travel over the Erbium-doped fiber. The Erbium-doped fiber absorbs the pumped lasers and generates a gain in the optical signals. The gain is generally between 20 dB and 30 dB. The optical signals then pass through the DCF. Due to the inherent properties of DCF, the DCF helps compensate for chromatic dispersion in the optical signals. The DCF insertion loss, typically about 8 dB to 10 dB, reduces the strength of the output signals. Therefore, the second stage operates similar to the first stage to compensate for the gain lost due to the DCF.

Another example is a discrete Raman amplifier. A discrete Raman amplifier can includes a span of DCF and one or more pumps. For discrete Raman amplifiers, the DCF comprises the gain medium to provide gain when pumped. In operation, the DCF span receives optical signals to be amplified. The pumps in the discrete Raman amplifier pump the DCF span as the optical signals travel over the DCF span. The DCF absorbs the pumped lasers and generates a gain in the optical signals due to the Raman Effect. Also, due to the inherent properties of the DCF, the DCF span helps compensate for chromatic dispersion in the optical signals. The gain range of the discrete Raman amplifier is flexible and depends on the wavelength of the pump laser. The pump laser amplifies wavelengths at one Raman Stokes away from the laser wavelength. A first order Raman Stokes comprises the wavelengths about 100 nm longer than the pump laser wavelength in glass fiber. For instance, a 1455 nm pump laser wavelength amplifies optical signals having wavelengths around 1550 nm.

One problem with using DCF to compensate for chromatic dispersion in amplifiers is that DCF has high PMD and thus may be susceptible to Polarization Mode Dispersion (PMD) fluctuation. The amount of PMD in DCF can be greater than the PMD equal to one span of 100 km SMF. PMD is a dynamic pulse broadening phenomena. In a single mode fiber, optical pulses propagating down the fiber may separate into two orthogonal modes of polarization that travel at different speeds. The relative amplitudes of these two pulses are determined by the state of polarization of the input pulse relative to the fiber's input principal states of polarization (PSP). The separation into the two orthogonal modes may be caused by intrinsic and extrinsic factors. The intrinsic factors may result from fiber manufacturing processes, such as core ellipticity, or built-in asymmetric stresses. The extrinsic factors may be caused by stresses due to twisting, bending, and environmental effects, such as temperature and thermal gradients.

If the core of the fiber has a perfectly circular cross-section, then both modes travel at the same speed over the same distance. Otherwise, one mode travels slower than the other resulting in a difference in group velocities (an effect called birefringence). Like chromatic dispersion, the difference in velocities between polarization modes is wavelength dependent. For PMD, the difference in velocity is also time dependent. The difference in propagation time, $\Delta\tau$, experienced by the two polarization modes at a given wavelength is referred to as the differential group delay (DGD) with units in picoseconds (ps). When the DGD in a fiber becomes excessively large, the receiver is unable to distinguish between a zero bit and a one bit, and bit errors occur eventually resulting in a PMD-induced outage.

Temperature variations can cause induced stress on fiber. The stress may cause PMD to fluctuate rapidly, which may increase the outage probability in high speed optical networks. If PMD fluctuates slowly about its mean value, such as day to night, then to compensate any large PMD variation can be easy. If PMD fluctuates quickly, such as over minutes or less, then PMD compensation is harder and PMD compensators may have to adaptively track and compensate for PMD. PMD may fluctuate on a time scale of minutes, seconds, or milliseconds depending on conditions of the entire optical network. Unfortunately, some current optical network elements may not be adequately protected against temperature variations. If the speed of the PMD fluctuation is determined by the PMD fluctuation of the outside (installed) fiber plant, then the effect of temperature on network elements need not be considered. However, in a real network even some fluctuation of the network elements, such as the DCF, can dominate the speed to the PMD within the network.

Some of the buildings that house components of an optical network are kept at a relatively constant temperature. For instance, optical amplifiers are often installed in an optical network at a repeater hut. The repeater hut is a little building where the fiber comes out of the ground and amplifiers and other components attach to the fiber. The repeater huts often have a heater and/or air conditioner to control the temperature in the repeater hut. A heater in the repeater hut has the purpose of heating the entire hut. If a door or window is open, if the heater malfunctions or is shut off, etc, then the temperature of the hut may change. A temperature change in the hut may result in PMD fluctuation on the optical network. Unfortunately, the heater in a repeater hut is not focused on maintaining a temperature of the components of the optical amplifier. The heater is focused mainly on maintaining a room-temperature environment.

Some EDFAs have been designed to protect against temperature variations. These EDFAs have a heating element around the Erbium-doped fiber span that keeps the Erbium-doped fiber span around 70 degrees Celsius. Erbium-doped fibers without the heating element may generate a gain that tilts over the gain bandwidth. The tilt may be 0.5 dB from one end of the gain bandwidth to the other. In a Wavelength Division Multiplexed (WDM) network having many channels, this gain tilt may not be acceptable. The heating element helps level the gain across the gain bandwidth of the EDFA. The EDFAs are not configured to reduce PMD fluctuation by protecting against temperature variations.

Unfortunately, optical amplifiers have not been effectively configured to protect against temperature variations. An optical network that is subjected to temperature variations may be susceptible to PMD fluctuation. PMD compensation may be difficult task in an optical network that has high and/or fast PMD fluctuation.

SUMMARY OF THE SOLUTION

The invention helps solve the above problems with systems and methods described herein. One example is an optical amplifier system comprising a span of dispersion compensating fiber (DCF) and a temperature control system. The temperature control system is positioned proximate to the DCF span. The DCF span is configured to carry optical signals. The temperature control system is configured to control the temperature of the environment directly surrounding the DCF span to reduce polarization mode dispersion (PMD) fluctuation in the DCF span.

Reducing PMD fluctuation may advantageously reduce the chance of an outage in an optical communication network due to PMD. Reducing PMD fluctuation may also eliminate the need for fast and expensive PMD compensators that have to adaptively track and compensate for PMD. Reducing PMD fluctuation may also prevent high differential group delays (DGD) between wavelengths of a Wavelength Division Multiplexing (WDM) network.

In another example of the invention, the temperature control system comprises a temperature chamber, a sensor system, a controller, and a heating element. The temperature chamber is configured to substantially enclose the DCF span. The sensor system measures a temperature in the temperature chamber. The sensor system then provides an indication of the temperature to the controller. The controller controls the heating element based on the indication of the temperature in the temperature chamber. The heating element emits heat in the temperature chamber based on the control by the controller.

The invention may include other examples described below.

DESCRIPTION OF THE DRAWINGS

The same reference number represents the same element on all drawings.

DETAILED DESCRIPTION OF THE INVENTION

FIGS. 1–4 and the following description depict specific examples of the invention to teach those skilled in the art how to make and use the best mode of the invention. For the purpose of teaching inventive principles, some conventional aspects of the invention have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

EXAMPLE #1

FIG. 1

Figure 1:
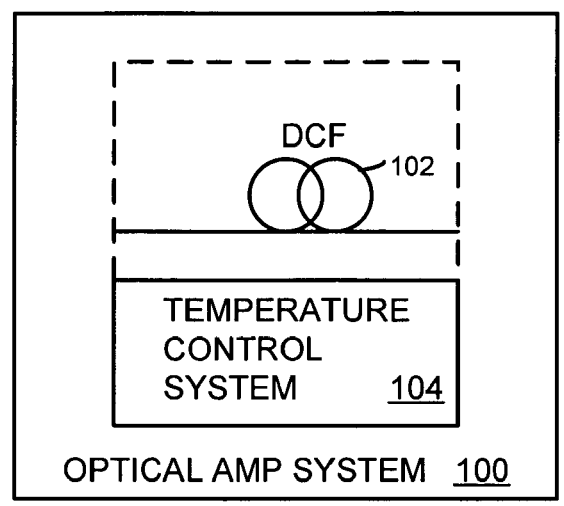
FIG. 1 illustrates an optical amplifier system in an example of the invention.

FIG. 1 illustrates an optical amplifier system 100 in an example of the invention. Optical amplifier system 100 comprises any system, component, or device configured to amplify optical signals in an optical communication network. FIG. 1 may not show all the components of optical amplifier system 100. FIG. 1 only shows optical amplifier system 100 as comprising a span of dispersion compensating fiber (DCF) 102 and a temperature control system 104. To amplify optical signals, optical amplifier system 100 may include other components not illustrated in FIG. 1. For instance, in one example, optical amplifier system 100 may further include an Erbium-doped fiber amplifier (EDFA). In another example, optical amplifier system 100 may further include a discrete Raman amplifier system. Optical amplifier system 100 may include other optical amplifier configurations not discussed herein.

As previously stated, optical amplifier system 100 comprises a DCF span 102 and a temperature control system 104. Temperature control system 104 is positioned proximate to DCF span 102. Being "proximate" refers to temperature control system 104 being positioned close to or next to DCF span 102 so that temperature control system 104 controls the temperature of the environment directly surrounding DCF span 102. In some examples, the environment directly surrounding DCF span 102 comprises an area extending about a foot around an outer perimeter of DCF span 102.

In operation, DCF span 102 carries optical signals. DCF span 102 may be used to help reduce chromatic dispersion of the optical signals. Temperature control system 104 controls the temperature of the environment directly surrounding DCF span 102 to reduce polarization mode dispersion (PMD) fluctuation in DCF span 102. In controlling the temperature of the environment directly surrounding DCF span 102, temperature control system 104 may be configured to maintain a constant temperature of the environment directly surrounding DCF span 102 to reduce the PMD fluctuation. Based on this disclosure, those skilled in the art will appreciate how to modify existing optical amplifiers to make optical amplifier system 100.

Reducing PMD fluctuation may advantageously reduce the chance of an outage due to PMD. Reducing PMD fluctuation may also eliminate the need for fast PMD compensators that have to adaptively track and compensate for PMD. Reducing PMD fluctuation may also prevent high differential group delays (DGD) between wavelengths of a Wavelength Division Multiplexing (WDM) network.

In one example, "proximate" may mean that temperature control system 104 is positioned within one foot of DCF span 102. When installed this close, temperature control system 104 is configured to control the temperature of the environment directly surrounding DCF span 102 independent of the temperature of the environment surrounding the remaining components (not shown) of optical amplifier system 100. The temperature of DCF span 102 may be more important in this example than the temperature of the other components of optical amplifier system 100. The installation of temperature control system 104 as described in this paragraph may be considered "proximate" for the scope of the invention. As a comparison, a heater in a repeater hut is not positioned proximate to the DCF span. The heater in a repeater hut is probably placed in a corner of the hut to be out of the way. The heater is not directed onto the DCF span 102 to control the temperature of the environment directly surrounding the DCF span 102. The heater heats the inside of the repeater hut. The heater does not control the temperature of the environment directly surrounding DCF span 102. If the door on the repeater hut is open for instance, the temperature of the environment directly surrounding DCF span 102 can change. The heater is not positioned or configured to provide the precise control over the temperature of the environment directly surrounding the DCF span as provided in the invention. Also, the heater may not be able to achieve the temperatures desired for temperature control system 104.

EXAMPLE #2

FIG. 2

Figure 2:
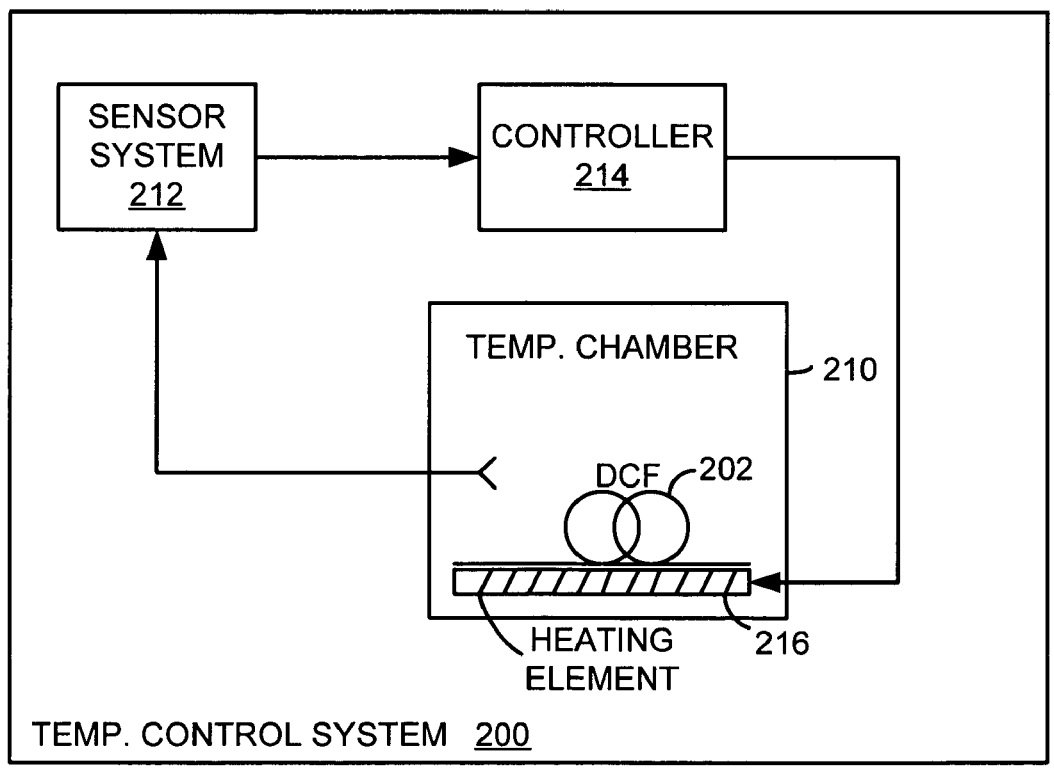
FIG. 2 illustrates a temperature control system in an example of the invention.

FIG. 2 illustrates a temperature control system 200 in an example of the invention. Temperature control system 200 may be an example of temperature control system 100 in FIG. 1. Temperature control system 200 comprises a temperature chamber 210, a sensor system 212, a controller 214, and a heating element 216.

Temperature chamber 210 comprises any structure configured to substantially enclose a dispersion compensating fiber span. In FIG. 2, temperature chamber 210 is configured to substantially enclose dispersion compensating fiber (DCF) span 202 of an optical amplifier (not shown). The area within temperature chamber 210 may be considered the environment directly surrounding DCF span 202. For illustrative purposes, assume that DCF span 202 comprises a conventional dispersion compensating module (DCM). A conventional DCM comprises a span of dispersion compensating fiber wrapped around a spool. The DCF is set in an adhesive on the spool to hold the fiber in place. For this DCM, temperature chamber 210 is configured to surround the entire DCM except for an inlet and an outlet for the DCM that extend out of temperature chamber 210. The inlet and outlet are for connecting the DCM to the rest of the optical amplifier.

Because temperature chamber 210 substantially encloses DCF span 202, the temperature in temperature chamber 210 is assumed to be about the temperature of DCF span 202. The temperature of DCF span 202 is what is of importance in this example. Therefore, when the temperature in temperature chamber 210 is referenced, this also references the temperature of DCF span 202.

Sensor system 212 comprises any system, component, or device configured to measure a temperature in temperature chamber 210 and provide an indication of the temperature. Sensor system 212 may include a temperature sensor located inside temperature chamber 210. Sensor system 212 may also include analog or digital circuitry configured to process a signal from the temperature sensor and provide an indication of the temperature.

Controller 214 comprises any system or processor configured to control the temperature in temperature chamber 210. Controller 214 may be configured to provide real-time adjustments to maintain a constant temperature in temperature chamber 210. The constant temperature may be between about 45 degrees Celsius and 70 degrees Celsius. Controller 214 is configured to control heating element 216 to maintain a desired temperature in temperature chamber 210.

In some examples, controller 214 may communicate with a remote processor to control the temperature in temperature chamber 210. Controller 214 may provide the indication of the temperature to the remote processor. The remote processor may then respond to controller 214 with instructions. For instance, controller 214 may generate an HTML file that includes the temperature in temperature chamber 210. The user of the remote processor may access a web page to view the temperature in temperature chamber 210 and/or the temperature in other temperature chambers 210 of an optical network. The user of the remote processor may then provide instructions to controller 214.

Controller 214 may be comprised of a processor and a storage media. The operation of controller 214 may be performed by instructions that are stored on storage media. The instructions can be retrieved and executed by the processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Heating element 216 comprises any system, device, or component configured to emit heat. Heating element 216 is configured to emit heat into temperature chamber 210 responsive to the control from controller 214. Heating element 216 is positioned proximate to DCF span 202 so that it may control the heat of DCF span 202 independent of the other components of the optical amplifier (not shown). Heating element 216 may comprise copper elements or a copper mesh configured to emit heat when a voltage is applied to the copper.

In other embodiments, temperature control system 200 may also include a cooling element (not shown) in temperature chamber 210 configured to cool the temperature in temperature chamber 210. Controller 214 may control the cooling element much like heating element 216.

In operation, sensor system 212 measures a temperature in temperature chamber 210. Sensor system 212 then provides an indication of the temperature in temperature chamber 210 to controller 214. Controller 214 compares the temperature in temperature chamber 210 with a desired temperature or a desired temperature range. If the temperature in temperature chamber 210 is at a desired temperature or within a desired temperature range, then controller 214 does not need to adjust the temperature in temperature chamber 210.

If the temperature in temperature chamber 210 is below a desired temperature or below a desired temperature range, then controller 214 controls heating element 216 to raise the temperature in temperature chamber 210. Controller 214 controls heating element 216 by transmitting control instructions, a control signal, a control voltage, or some other control. Controlling heating element 216 to raise the temperature may comprise increasing a voltage applied to heating element 216.

If the temperature in temperature chamber 210 is above a desired temperature or above a desired temperature range, then controller 214 controls heating element 216 to lower the temperature in temperature chamber 210. Controlling heating element 216 to lower the temperature may comprise decreasing a voltage applied to heating element 216. Temperature control system 200 continually operates as described above to maintain a constant, desired temperature in temperature chamber 210.

EXAMPLE #3

FIG. 3

Figure 3:
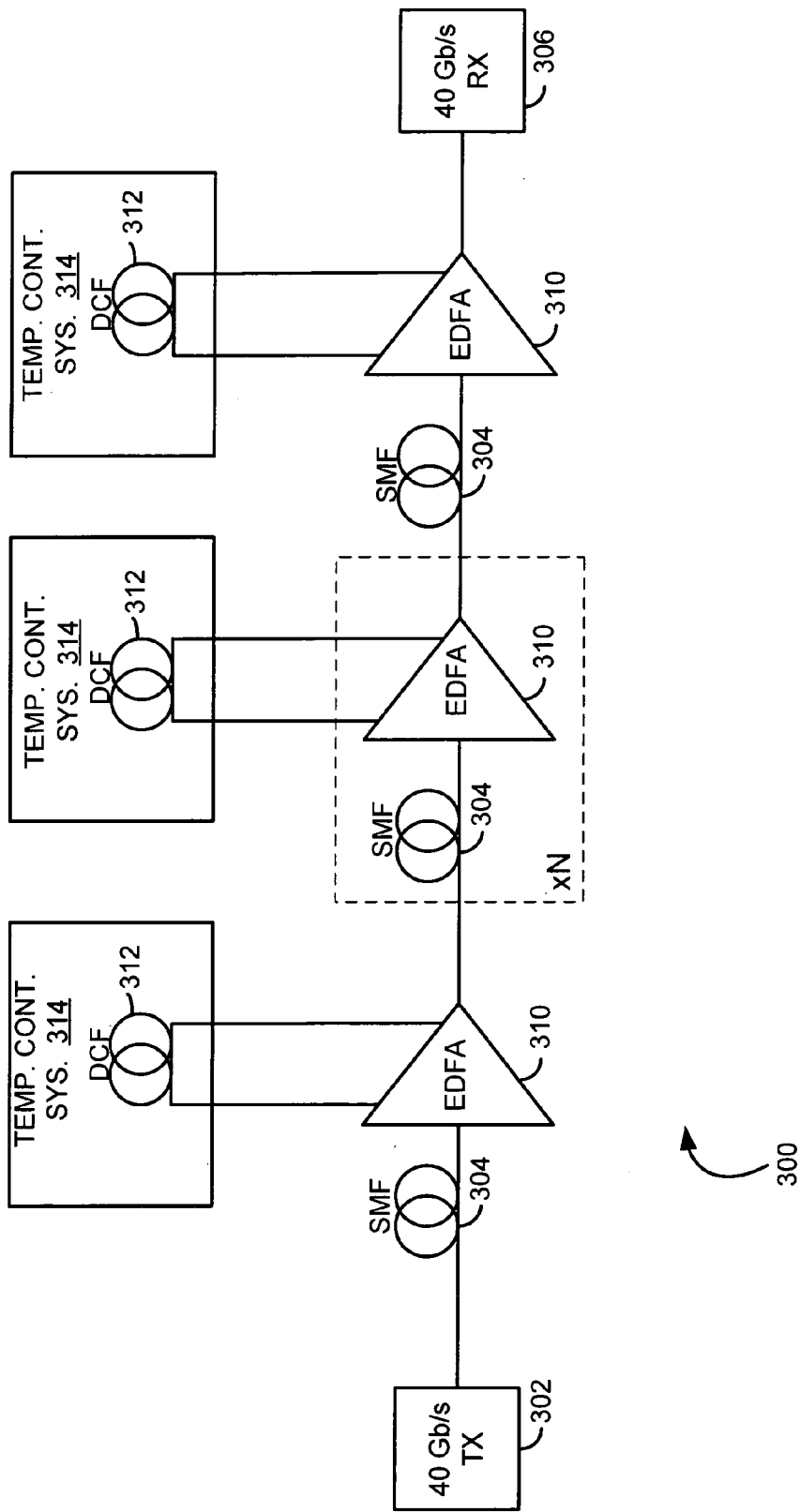
FIG. 3 illustrates an optical communication network in an example of the invention.

FIG. 3 illustrates an optical communication network 300 in an example of the invention. Communication network 300 comprises a transmitter 302, spans of Single Mode Fiber (SMF) 304, Erbium-doped fiber amplifiers (EDFA) 310, and a receiver 306. Transmitter 302 is configured to transmit at a data rate of 40 Gb/s. Receiver 306 is configured to receive at a data rate of 40 Gb/s. SMF spans 304 each comprise an 80 km span of single mode fiber. Each EDFA 310 is coupled to a span of dispersion compensating fiber (DCF) 312. A temperature control system 314 is positioned proximate to each DCF span 312. Temperature control system 314 may comprise temperature control system 200 illustrated in FIG. 2. Communication network 300 may include N number of SMF spans 304, EDFAs 310, DCF spans 312, and temperature control systems 314 depending on the distance between transmitter 302 and receiver 306.

In operation, transmitter 302 transmits optical signals and the first SMF span 304 transports the optical signals. The optical signals experience some degradation due to the attenuation along the fiber. This attenuation may be the result of fiber background loss in the SMF. The optical signals may also degrade due to other limitations, such as chromatic dispersion, Polarization Mode Dispersion (PMD), and nonlinear effects. The first EDFA 310 amplifies the optical signals to recover the strength of the optical signals. After the first EDFA 310 amplifies the optical signals, the first EDFA 310 transfers the optical signals to DCF span 312.

Due to the inherent properties of dispersion compensating fiber, DCF span 312 helps compensate for chromatic dispersion in the optical signals. DCF span 312 has a total dispersion of about 1300 ps/nm to compensate for chromatic dispersion on an 80 km SMF span 304. Temperature control system 314 controls the temperature of the environment directly surrounding DCF span 312 to be at a constant temperature. The constant temperature may be between about 45 degrees Celsius and 70 degrees Celsius for optimal performance. In some examples, the environment directly surrounding DCF span 312 comprises an area extending about a foot around an outer perimeter of DCF span 312. Advantageously, the constant temperature may help to reduce PMD fluctuation in DCF span 312. Reducing PMD fluctuation may make compensating for PMD an easier task.

DCF span 312 may also reduce the amount of gain in the optical signals. Therefore, EDFA 310 may be a two-stage amplifier wherein the second stage amplifies the optical signals to recover any gain lost in DCF span 312.

The same operation takes place in each EDFA 310 until the optical signals reach receiver 306. Notice that an EDFA 310 and a DCF span 312 follows each SMF span 304 in this example. Due to the attenuation in each SMF span 304, an EDFA 310 is needed to amplify the optical signals and an EDFA 310 is used to compensate for chromatic dispersion. There may be other components in communication network 300 that are not shown for the sake of brevity. For instance, there may be a system in communication network 300 that compensates for PMD on the optical signals.

EXAMPLE #4

FIG. 4

Figure 4:
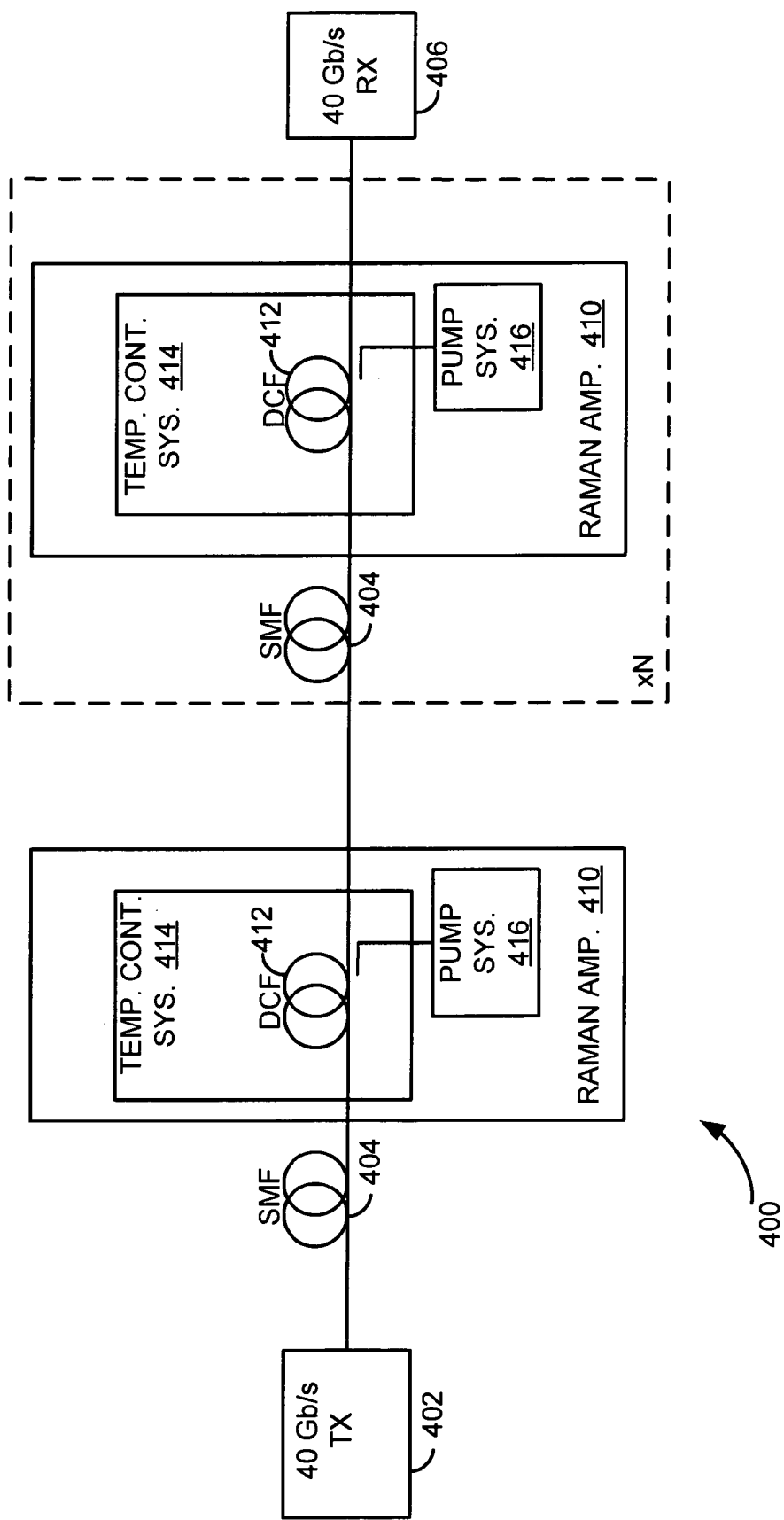
FIG. 4 illustrates another optical communication network in an example of the invention.

FIG. 4 illustrates an optical communication network 400 in an example of the invention. Communication network 400 comprises a transmitter 402, spans of Single Mode Fiber (SMF) 404, Raman amplifiers 410, and a receiver 406. Transmitter 402 is configured to transmit at a data rate of 40 Gb/s. Receiver 406 is configured to receive at a data rate of 40 Gb/s. SMF spans 404 each comprise an 80 km span of single mode fiber. Each Raman amplifier 410 includes a span of dispersion compensating fiber (DCF) 412, a temperature control system 414, and a pump system 416. Communication network 400 may include N number of SMF spans 404 and Raman amplifiers 410 depending on the distance between transmitter 402 and receiver 406. There may also be Raman pumps configured to pump lasers onto SMF spans 404 to generate distributed Raman gain.

In operation, transmitter 402 transmits optical signals, and the first SMF span 404 transports the optical signals. The optical signals experience some degradation due to the attenuation along the fiber. This attenuation may be the result of fiber background loss in the SMF. The optical signals may also degrade due to other limitations, such as chromatic dispersion, Polarization Mode Dispersion (PMD), and nonlinear effects. The first Raman amplifier 410 receives the optical signals over DCF span 412. Concurrently, pump system 416 backward pumps DCF span 412. The first Raman amplifier 410 amplifies the optical signals in DCF span 412 due to the Raman Effect to help to recover the strength of the optical signals. In some examples, Raman amplifier 410 may include another pump system configured to forward pump DCF span 412.

In addition to amplifying the optical signals, DCF span 412 helps compensate for chromatic dispersion in the optical signals. DCF span 412 has a total dispersion of about 1300 ps/nm to compensate for chromatic dispersion on an 80 km SMF span 404. Temperature control system 414 controls the temperature of the environment directly surrounding DCF span 414 to be at a constant temperature. The constant temperature may be between about 45 degrees Celsius and 70 degrees Celsius for optimal performance. In some examples, the environment directly surrounding DCF span 414 comprises an area extending about a foot around an outer perimeter of DCF span 414. Advantageously, the constant temperature may help to reduce PMD fluctuation in DCF span 412. Reducing the PMD fluctuation may make compensating for PMD an easier task.

The same operation takes place in each Raman amplifier 410 until the optical signals reach receiver 406. Notice that a Raman amplifier 410 follows each SMF span 404 in this example. Due to the attenuation in each SMF span 404, a Raman amplifier 410 is needed to amplify the optical signals and compensate for chromatic dispersion. There may be other components in communication network 400 that are not shown for the sake of brevity. For instance, there may be a system in communication network 400 that compensates for PMD on the optical signals.

The above examples advantageously reduce the chance of network outages. By controlling temperature fluctuation of the dispersion compensating fiber and the structures that support the dispersion compensating fiber, thermal expansion of the dispersion compensating fiber and the structure is reduced resulting in a reduced stress on the dispersion compensating fiber. Reducing the stress on the dispersion compensating fiber helps control PMD fluctuation and makes PMD compensation an easier task. Consequently, the chance of an outage due to PMD may advantageously be reduced.

What is claimed is:

1. An optical amplifier system for use in an optical communication network, the optical amplifier system comprising:
   a span of dispersion compensating fiber configured to carry optical signals; and
   a temperature control system positioned proximate to the span of dispersion compensating fiber and configured to control the temperature of the environment directly surrounding the span of dispersion compensating fiber to reduce polarization mode dispersion fluctuation in the span of dispersion compensating fiber wherein the temperature control system comprises:
     a temperature chamber configured to substantially enclose the span of dispersion compensating fiber;
     a sensor system configured to measure a temperature in the temperature chamber and provide an indication of the temperature;
     at least one heating element configured to emit heat in the temperature chamber; and
     a controller configured to control the at least one heating element based on the indication of the temperature in the temperature chamber.

2. The optical amplifier system of claim 1 wherein the controller is configured to control the at least one heating element by varying a voltage applied to the at least one heating element.

3. An optical amplifier system for use in an optical communication network, the optical amplifier system comprising:
   a span of dispersion compensating fiber configured to carry optical signals; and
   a temperature control system positioned proximate to the span of dispersion compensating fiber and configured to control the temperature of the environment directly surrounding the span of dispersion compensating fiber to reduce polarization mode dispersion fluctuation in the span of dispersion compensating fiber;
   a pump system configured to pump the span of dispersion compensating fiber;
   wherein the optical amplifier system is configured to amplify the optical signals traveling over the span of dispersion compensating fiber due to the Raman Effect.

4. A method of operating an optical amplifier system comprising a span of dispersion compensating fiber configured to carry optical signals, wherein the optical amplifier system is configured for use in an optical communication network, the method comprising:
   positioning a temperature control system proximate to the span of dispersion compensating fiber; and
   controlling the temperature of the environment directly surrounding the span of dispersion compensating fiber with the temperature control system to reduce polarization mode dispersion fluctuation in the span of dispersion compensating fiber; wherein the temperature control system comprises a temperature chamber configured to substantially enclose the span of dispersion compensating fiber, a sensor system, at least one heating element, and a controller, the method further comprising:
     in the sensor system, measuring a temperature in the temperature chamber and providing an indication of the temperature;
     in the at least one heating element, emitting heat in the temperature chamber; and
     in the controller, controlling the at least one heating element based on the indication of the temperature in the temperature chamber.

5. The method of claim 4 wherein controlling the at least one heating element comprises:
   controlling the at least one heating element by varying a voltage applied to the at least one heating element.

6. A method of operating an optical amplifier system comprising a span of dispersion compensating fiber configured to carry optical signals, wherein the optical amplifier system is configured for use in an optical communication network, the method comprising:
   positioning a temperature control system proximate to the span of dispersion compensating fiber; and
   controlling the temperature of the environment directly surrounding the span of dispersion compensating fiber with the temperature control system to reduce polarization mode dispersion fluctuation in the span of dispersion compensating fiber; wherein the optical amplifier system further comprises a pump system, the method further comprising:
     pumping the span of dispersion compensating fiber with the pump system;
     wherein the optical amplifier system is configured to amplify the optical signals traveling over the span of dispersion compensating fiber due to the Raman Effect.

* * * * *